T. F. DEVLIN.
EXPANSION BOLT.
APPLICATION FILED SEPT. 28, 1917.
1,361,836.
Patented Dec. 14, 1920.
FIG. I.
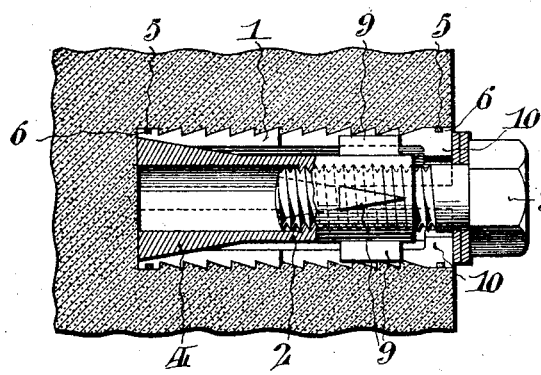
FIG. IV.
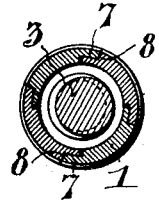
FIG. V.
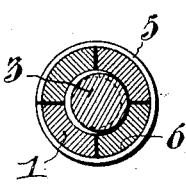
FIG. II.
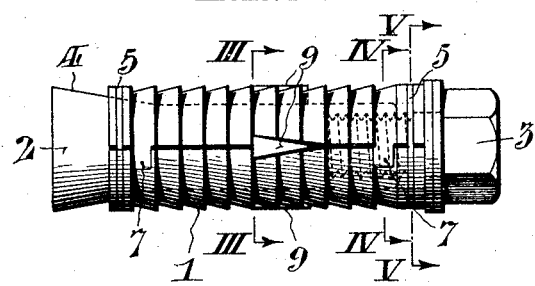
FIG. VI.
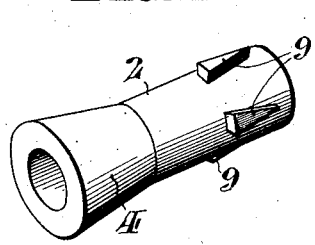
FIG. VII.
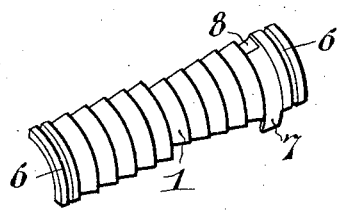
FIG. III.
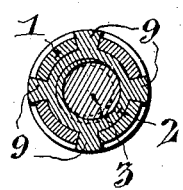
Inventor
Thomas Frank Devlin
Witnesses
John C. Bergner
James H. Bell
Attorneys

UNITED STATES PATENT OFFICE.

THOMAS FRANK DEVLIN, OF PHILADELPHIA, PENNSYLVANIA.

EXPANSION-BOLT.

1,361,836.                    Specification of Letters Patent.    Patented Dec. 14, 1920.

Application filed September 28, 1917. Serial No. 193,672.

*To all whom it may concern:*

Be it known that I, THOMAS FRANK DEVLIN, of Philadelphia, in the county of Philadelphia and State of Pennsylvania, have invented certain new and useful Improvements in Expansion-Bolts, whereof the following is a specification, reference being had to the accompanying drawings.

My invention relates to an expansion bolt comprising an expansible sleeve, a wedge nut and a screw bolt. As heretofore constructed such expansion bolts have relied solely upon the pulling forward of the wedge nut in the expansible sleeve by rotation of the screw bolt to effect the expansion of the sleeve, by which it is caused to firmly engage itself in the aperture prepared for it. I find that a more useful expansion bolt can be constructed if the wedge nut is allowed to initially project a considerable distance in the rear of the expansible sleeve, so that, with proper regulation of the depth of the aperture into which it is to be inserted, the initial insertion of the sleeve brings the rear of the wedge nut into contact with the rear end of the prepared aperture. The sleeve is then driven farther in, the screw bolt being removed from it, whereby there is compelled an advance of the wedge nut into the sleeve, accomplishing expansion of the sleeve, effecting in itself a firm engagement of the expansion nut with the walls of its aperture. The screw bolt is then inserted, and after it has been screwed in place, its continued rotation effects further forward advancement of the wedge nut within the expansion bolt, occasioning further expansion of the sleeve. In order that this method of operation may be feasible, it is desirable that the screw bolt when screwed home, shall be shorter than the sleeve—preferably considerably shorter. If this is the case, it is necessary, in order to obtain the required engagement of the screw with the wedge nut, that the latter shall be made considerably longer than has heretofore been customary. Accordingly, in my construction, I provide a wedge nut which is relatively long and a screw bolt which is relatively short. The relatively long wedge nut has further advantages in that by such construction the expansible sleeve is capable of enlargement not merely in the region of the rear end, but throughout its length. In the embodiment of my invention here described, simultaneously with the expansion of the rear end of the sleeve by the conical surface of the nut, there is an expansion of the sleeve near its front end, accomplished by wedge shaped projections formed upon the front part of the nut wedging the segments of the sleeve apart.

In the accompanying drawings, Figure I, is a sectional view representing an expansion bolt comprising my invention as it rests in the aperture prepared for it in a masonry wall.

Fig. II, is a side view of the expansion bolt.

Figs. III, IV, and V, are sectional views respectively, along the lines III, III, IV, IV, and V, V, of Fig. II.

Fig. VI, is a view of the nut.

Fig. VII, is a view of one of the segments of which the sleeve is composed.

As usual in this art, my expansion bolt comprises the expansible sleeve 1, wedge nut 2, and screw bolt 3.

The expansible sleeve has a roughened external surface and is composed of a plurality of longitudinal segments. I have shown four of such segments, one of which is separately illustrated in Fig. VII. The segments are held together with capacity for expansion by yielding wire springs 5, 5, resting in grooves 6, 6, preferably one near each end of the sleeve. Each segment is provided with a projection 7, registering with a corresponding recess 8, in the adjoining segment, which interfitting effectually prevents lateral movement of the segments relative to each other.

The wedge nut 2, is longer than has been customary in this art. It has its rear portion in the shape of a truncated cone 4, affording a wedging surface capable of expanding the rear end of the expansible sleeve. For the purpose of increasing the area of the wedging surface, the width of the sleeve may be beveled to correspond to the inclination of the cone of the wedge nut.

Near the forward end of the wedge nut a series of triangular wedge-shaped projections 9, are formed in positions to correspond to the lines of separation between the segments of the sleeve. The opposing edges of the segments are cut away to receive these projections of the wedge nut, and the edges of the segments are inclined so that the advancement of the wedge nut with its projections forces the forward end of the segments apart, thus correspondingly enlarging this end of the sleeve.

The forward end of the sleeve is preferably thickened by the interior flange 10, strengthening the expansible sleeve and affording a suitable resistance surface for the bolt, notwithstanding the expansion of the sleeve. The wedge nut is threaded only near its forward end, for a sufficient length to insure the proper engagement of the screw with its nut.

The bolt 3, is of the usual construction. It is comparatively short, so that when screwed home it will not project beyond the rear end of the sleeve, it being only necessary for it to be long enough to effectually engage the forward end of the wedge nut.

In operation after a suitable aperture has been prepared in a stone or masonry wall within which the expansion bolt is to be fitted, the sleeve with its wedge nut (the bolt being removed), is driven therein. Until the nut contacts with the end of the aperture, the sleeve is not expanded although the wedge nut projects rearwardly some distance beyond the rear of the expansion sleeve. Accordingly the rear end of the wedge nut first comes in contact with the rear end of the prepared aperture, and the further driving in of the sleeve compels the relative advance of the wedge nut within the sleeve, accomplishing expansion of the sleeve. As previously noted this expansion operates throughout the entire length of the sleeve, the conical portion of the nut expanding the rear end while the triangular projections upon the other part of the wedge nut effect the expansion of the forward end. In this way the sleeve is enabled to maintain a firm grasp for its entire length upon the aperture which has been prepared for it. Thereafter the screw bolt is inserted and screwed home. Further rotation of the bolt then increases the effective expansion of the sleeve.

It will therefore be understood as characteristic of my invention that I employ a comparatively long wedge nut and a comparatively short screw bolt. I find among other advantages that it is cheaper to manufacture a long wedge nut and a short screw bolt as compared with reversing their relations. I am also by means of this new relation between these parts able to secure the further advantages which have already been referred to, to wit,—the initial expansion of the sleeve occasioned merely by its driving into its aperture and the capacity of the nut to expand the forward as well as the rear end of the expansible sleeve. Only the forward end of the interior of the wedge nut need be threaded, and I find that it is advantageous to thus restrict the interior threading to the portion directly engaging the thread of the screw bolt.

Having thus described my invention, I claim:

1. In an expansion bolt, the combination of a sleeve expansible from end to end, and an elongated expanding nut within said sleeve tapered at its inner end and having wedging surfaces interposed between the relatively separable edges of said sleeve forward of the middle thereof, so as to expand said sleeve throughout its whole length.

2. In an expansion bolt, the combination of an expansible sleeve; a long wedge nut initially projecting beyond the rear end of said sleeve; and wedging means associated with said nut interposed between the edges of the relatively expansible parts of said sleeve forward of the middle point of the length thereof, so that the forward as well as the rear end of the sleeve is expanded.

3. An expansion bolt comprising an elongated expanding nut having a conical expansion surface at its rear end and triangular wedging projections near its forward end, and also having an internally threaded portion at its forward end adapted to engage a relatively short expanding bolt and an opening in its rear portion slightly larger than the threaded portion, so as to afford space for the end of the expanding bolt; and an expansible sleeve formed of a plurality of segments with their edges cut away to receive said triangular projections and so inclined that the advance of the projections wedges apart the forward end of the sleeve simultaneously with the expansion of the rear end by the conical expansion surface.

In testimony whereof, I have hereunto signed my name at Philadelphia, Pennsylvania, this twenty-first day of September, 1917.

THOMAS FRANK DEVLIN.

Witnesses:
  JAMES H. BELL,
  E. L. FULLERTON.